United States Patent [19]

Flood

[11] Patent Number: 6,062,308

[45] Date of Patent: May 16, 2000

[54] WELL HEADER FOR USE IN FRIGID ENVIRONMENTS

[75] Inventor: Patrick M. Flood, Anchorage, Ak.

[73] Assignee: Atlantic Richfield Company, Los Angeles, Calif.

[21] Appl. No.: 09/115,726

[22] Filed: Jul. 15, 1998

[51] Int. Cl.[7] .............................. E21B 36/00; E21B 43/00
[52] U.S. Cl. ........................... 166/52; 137/602; 137/896; 166/57; 166/75.11
[58] Field of Search .................................. 166/57, 75.11, 166/90.1, 901, 902, 52, 302, 243; 137/561 A, 602, 896, 897, 883

[56] References Cited

U.S. PATENT DOCUMENTS

| | | | |
|---|---|---|---|
| 2,654,434 | 10/1953 | Culleton | 166/54 |
| 3,785,402 | 1/1974 | Collier | 137/561 A |
| 3,825,122 | 7/1974 | Taylor | 210/134 |
| 4,020,902 | 5/1977 | Valdespino | 166/52 |
| 4,220,012 | 9/1980 | Brister | 62/130 |
| 4,249,375 | 2/1981 | Grundmann et al. | 60/309 |
| 4,518,663 | 5/1985 | Kodali et al. | 429/18 |
| 4,591,095 | 5/1986 | Fama | 239/102 |
| 4,729,404 | 3/1988 | Hergenroeder | 137/602 |
| 4,790,375 | 12/1988 | Bridges et al. | 166/60 |
| 4,800,921 | 1/1989 | Greebe | 137/561 A |
| 5,316,384 | 5/1994 | Corso | 366/338 |

Primary Examiner—David Bagnell
Assistant Examiner—Chong S. Cho
Attorney, Agent, or Firm—Drude Faulconer

[57] ABSTRACT

A header capable of fluidly connecting a plurality of spaced terminals (e.g. wellheads} to a centralized location in a frigid environment while eliminating or substantially alleviating freezing within the header. The flowpath through the header is such that it forces a relatively warm fluid (e.g. production or injection fluid) to flow through the entire length of the header before the fluid is produced or injected from the header. This allows the relatively warm fluid to continuously transfer heat to the header as it flows therethrough to provide the heat necessary to prevent freezing within the header.

10 Claims, 2 Drawing Sheets

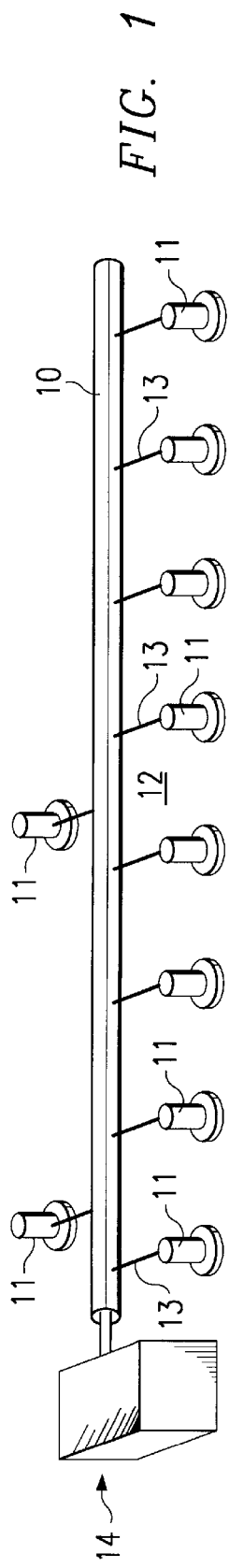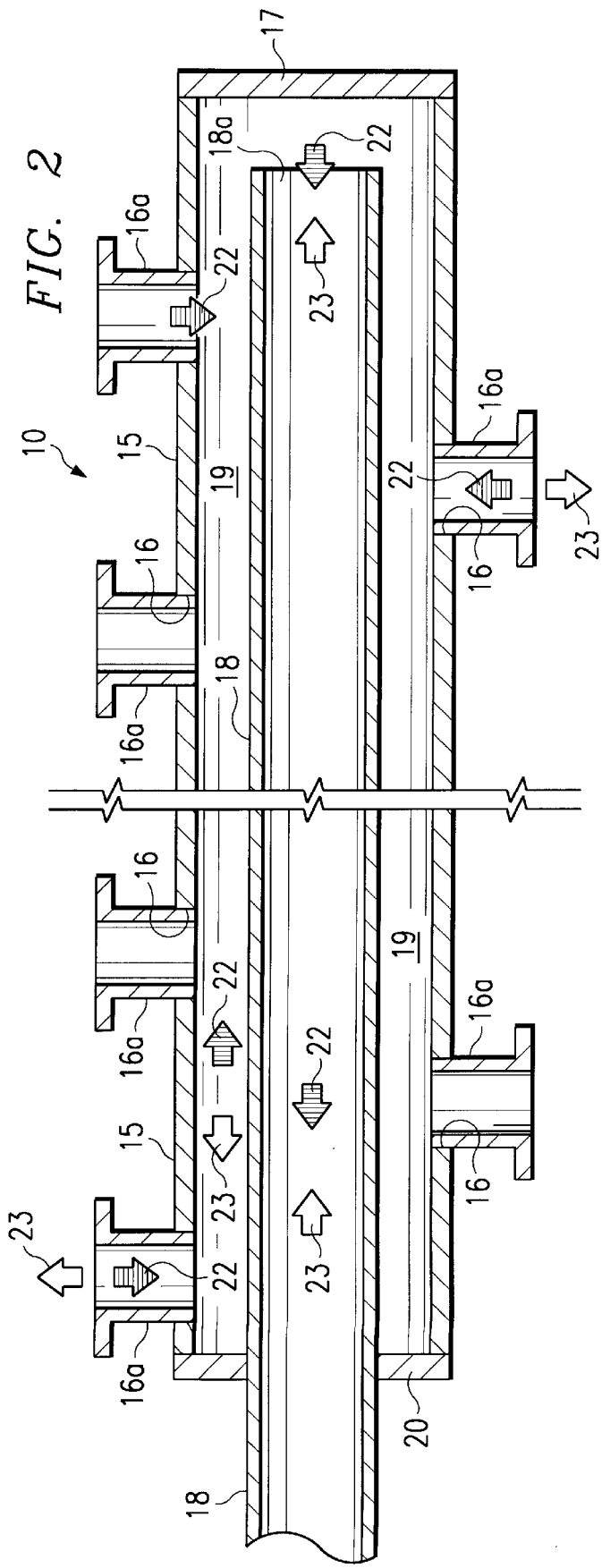

WELL HEADER FOR USE IN FRIGID ENVIRONMENTS

DESCRIPTION

1. Technical Field

The present invention relates to a header for distributing and/or collecting fluids in a frigid environment and in one aspect relates to a header for distributing or collecting fluids to each of several spaced wellheads which have been drilled and completed in a frigid environment wherein the header has a flowpath designed to prevent freezing within the header.

2. Background

It is well known that large reservoirs of petroleum (e.g. heavy oil) are found in certain frigid areas of the world; e.g. the North Slope area of Alaska. As will be readily recognized, the extreme cold temperatures which normally exist in these areas significantly add to the problems and costs involved in producing and servicing these reservoirs. For example, one major cost particular to frigid environments is that involved in protecting individual manifolds or "header(s)" which are used to distribute and/or collect fluids from freezing up during operation. Such headers may be used to service a plurality of wells which, in turn, have been drilled and completed at spaced intervals and may be used as (a) a production header, i.e. a manifold which collects or "gathers" the fluids (i.e. oil, gas, and water) from spaced, producing wells and carry them to a centralized point; (b) an injection header, i.e. a manifold which carries fluids (e.g. water) from a centralized point to spaced injection wells for disposal and/or for repressuring downhole formations as is done in typical secondary recovery methods (i.e. water-flood operations); (c) a header which gathers production for a separator or which distributes injectant from a pump; or (d) any field application where fluids are to be distributed or collected between various locations and a centralized point.

In protecting these headers in frigid conditions, it is necessary to prevent any substantial portion (e.g. water) of either the production or injection fluids from freezing within the header; especially within those portions of the header where there is little or no flow (i.e. "dead legs"). For example, water, which is almost always a component of the fluids flowing through the header, has a tendency to accumulate or collect in the dead legs of the header. When this water cools sufficiently to freeze, it can block the flowpath through the header which, in turn, can severely damage the header or, at a minimum, result in increased operating costs due to the efforts required to thaw out the header and return it to full operation.

Currently, there are several approaches to prevent freezing within a header in a frigid environment. These approaches include: enclosing the header in a heated structure; insulating the header and associated piping; and/or strapping an electrical, heating element or "trace" to the outside of the header to maintain the temperature within the header at an acceptable flow temperature. Another commonly-used technique involves merely displacing all production/injection fluids out of the header and associated piping and back into the wellbore with a non-freezing or anti-freeze fluid (e.g. methanol, diesel, or natural gas) during no-flow conditions. While all of the above have merit, each has certain disadvantages.

For example, insulating the header and the associated laterals leading from the header to the respective distribution/collection terminals (e.g. wellheads), in addition to adding to the capital costs, may not prevent freezing within the header in all situations but may merely slow down the freezing process. As to displacing the fluids out of the header with anti-freeze fluids, this is expensive and labor intensive in that it must be carried out manually and can only be done during no-flow conditions. And finally, strapping a heat trace to the outside of the header, in addition to the cost involved, is normally inefficient due to the amount of heat which is lost directly to the atmosphere surrounding header. That is, a large portion of the heat generated by an externally-mounted heat trace is immediately lost without ever being conveyed into the header where it needed. Accordingly, it can be seen that the need continues to exist for a relatively inexpensive header which substantially alleviates the freezing problem when the header is used to service a plurality of spaced wells in a frigid environment.

SUMMARY OF THE INVENTION

The present invention provides a header which is capable of fluidly connecting a plurality of spaced terminals (e.g. wellheads) to a centralized location and which is constructed to eliminate or substantially alleviate the problems associated with freezing in frigid environments. The flowpath through the header is such that it forces a relatively warm fluid (e.g. production or injection fluid) to flow through the entire length of the header before it is produced/injected from the header. This allows the relatively warm fluid to continuously transfer heat to the header as it flows therethrough to provide the heat necessary to prevent freezing within the header.

More specifically, the header of the present invention is adapted for fluidly connecting a plurality of spaced terminals (e.g. wellheads} with a centralized location (e.g. a collection point for production wells or a supply point for injection wells). The header is comprised of an outer conduit which is closed at its outer end and is adapted to extend from the centralized location to a point substantially adjacent or beyond the furthest terminal. The outer conduit has a plurality of ports along its length which are spaced to substantially coincide with each of the wellheads.

An inner conduit is positioned within the outer conduit and extends substantially along the length of the outer conduit thereby forming an annulus between the two conduits. The outer end of the inner conduit is in fluid communication (e.g. the inner end of the inner conduit does not extend all the way to the closed end of outer conduit) with the annulus thereby defining a flowpath through the header whereby fluids flow through both the inner conduit and the annulus. The header is connected to each of the terminals whereby fluids can flow from the flowpath within the header to the individual terminals. The unique flowpath through the header allows the relative warm fluids (e.g. production or injection fluids) to continuously transfer heat to the header as they flow therethrough thereby preventing or alleviating freezing problems within the header.

In a first embodiment, a terminal is fluidly connected to a respective port in the outer conduit whereby the fluids flow between the terminals and the annulus within the header. In another embodiment, individual pipes pass through respective ports in the outer conduits and are fluidly connected to respective spaced openings in the inner conduits which, in turn, are aligned with the ports in the outer conduit whereby fluids flow between the inner conduit and the respective terminals.

BRIEF DESCRIPTION OF THE DRAWINGS

The actual construction, operation, and apparent advantages of the present invention will be better understood by referring to the drawings which are not to scale and in which like numerals identify like parts and in which:

FIG. 1 is a perspective view, not to scale, of a plurality of terminals (e.g. wellheads) being serviced by a header constructed in accordance with the present invention;

FIG. 2 is a sectional view of the header of FIG. 1; and

BEST KNOWN MODE FOR CARRYING OUT THE INVENTION

Figure 3:
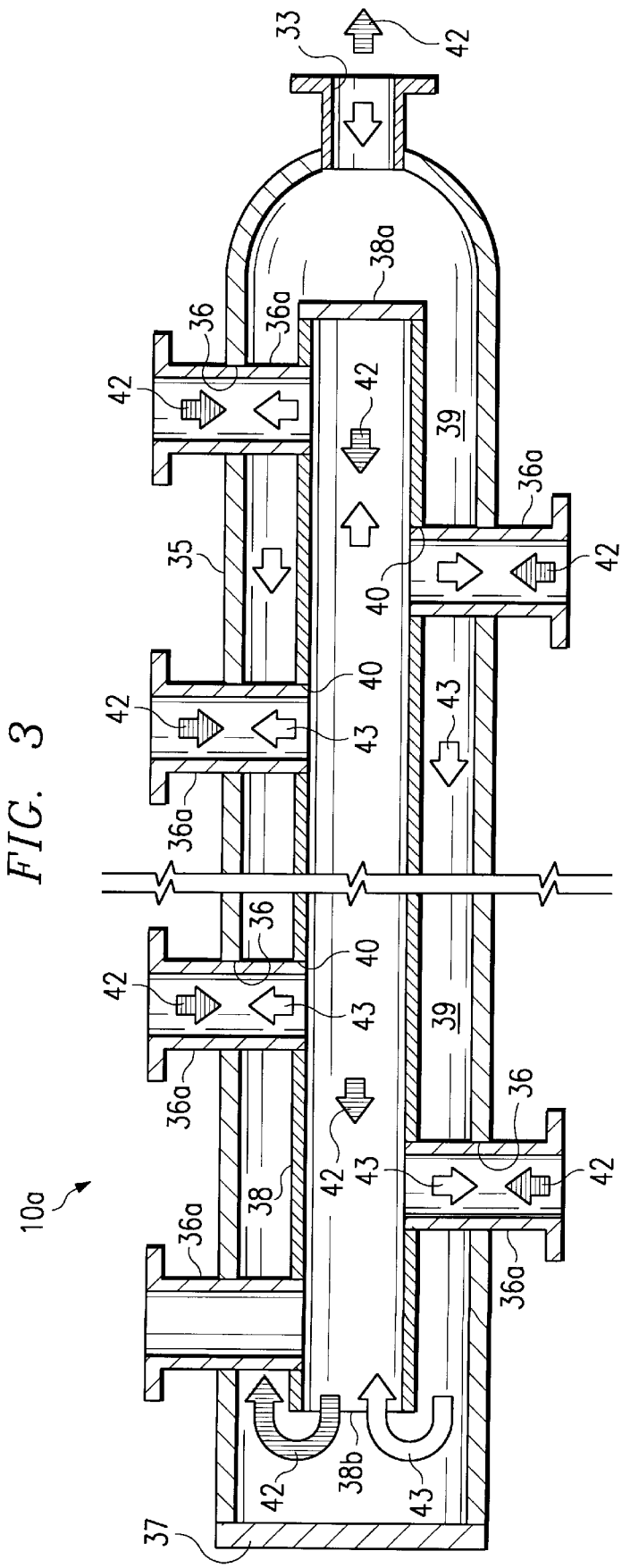
FIG. 3 is a sectional view of a further embodiment of the header of FIG. 2.

Referring more particularly to the drawings, FIG. 1 illustrates the header 10 of the present invention in an operable position as it distributes or collects fluids between a plurality of spaced terminals 11 and a centralized point or facility 14. While terminals 11 (only some are numbered for clarity) can be any station or structure to which fluids are to be distributed and/or collected, they are illustrated in FIG. 1 as wellheads of production/injection wells which, in turn, have been drilled and completed at spaced locations on the earth's surface 12. As will be understood by those skilled in this art, the spacing of the wellheads 11, as shown in FIG. 1, is for illustration purposes only and is not necessarily to scale. This spacing between wellheads 11 in actual field applications may vary from about 8 feet or less up to 120 feet or more.

As shown in FIG. 1, all of the wellheads 11 are fluidly connected to a single manifold or header 10 by means of respective lateral pipes 13. Where the wells are producing wells, the production fluids (e.g. oil, gas, and/or water) from a particular well flow through its wellhead 11 and lateral pipe 13 into header 10. The fluids commingle within the header 10 and flow through the header to a centralized, location 14 for further handling. Where the wells are injection wells, the reverse is true. That is, an injection fluid (e.g. water for disposal or for use in water-flooding operations) flows from centralized location 14, through header 10, and out into each of the wellheads 11 through its respective lateral pipe 13. Of course, it should be understood that certain wellheads 11 can be shut-in when the situation dictates and fluids will be produced or injected through only those wellheads that are open (i.e. on-line).

Where the wells have been completed in a frigid environment, fluids such as water has a tendency to "freeze-up" in the header, especially where the header may be several tens or hundreds of feet long and have one or more "dead legs" or low spots therein where water may accumulate. When freezing occurs, the flowpath through the header becomes blocked or severely restricted which, in turn, usually results in increased operating costs, i.e. damage to the header; time lost in thawing out the header; etc.

In accordance with the present invention, a header 10 is provided which is constructed to eliminate or substantially alleviate the problems associated with freezing in frigid environments. Referring now to FIG. 2, header 10 is comprised of an outer conduit 15 which has a plurality of ports 16 spaced along its length. Each port 16 is adapted to be fluidly connected to a lateral pipe 13 which, in turn, leads to a respective wellhead 11 (FIG. 1) so ports 16 will be spaced accordingly along outer conduit 15. The outer end of outer conduit 15 is closed by a cap or closure plate 17 or the like.

Inner conduit 18 is positioned within outer conduit 15 and extends substantially throughout the length of outer conduit 15 to form an annulus 19 between the outer surface of inner conduit 18 and the inner surface of outer conduit 15. As shown, the outer end 18a of inner conduit 18 terminates just short of plate 17 to provide fluid communication between inner pipe 18 and the annulus 19. It should be understood that inner conduit could also extend all the way to plate 17 in which case, it would have slots or openings therein (not shown) near its outer end to provide the necessary fluid communication between inner conduit 18 and annulus 19 without departing from the present invention. Also, spacers or centralizers (not shown) can be used, if required, to "center" inner tubing within outer conduit 15. The annulus 19 is closed at the inner end of outer conduit 15 by an appropriate sealing means (e.g. plate 20) to prevent flow out of annulus 19.

In operations where header 10 is used as a collection header (e.g. production header), production fluids flow from on-line wellheads 11 and through their respective lateral pipes 13 into the outer conduit 15 of header 10 through their respective ports 16. The relative warm production fluids (black arrows 22 in FIG. 2) commingle in the annulus 19 of header 10 and flow into inner conduit 18 through open inner end 18a. The productions fluids 22 then flow through the entire length of inner conduit 18, which extends substantially throughout the length of outer conduit 15.

This flow of warm production fluids through the entire length of inner conduit 18 and through at least a portion of the annulus 19 continuously transfers heat to the header 10, thereby preventing freezing in any part of header 10 for so long as at least one well is on line and its flow rate is sufficient to provide the necessary heat.

In operations where header 10 is used as a distribution header (e.g. an injection header), the direction of flow is reversed but the results are basically the same. That is, a relatively warm injection fluid (white arrows 23 in FIG. 2) is flowed from centralized location 14 into and through inner conduit 18 of header 10. Fluid 23 exits through the outer end 18a of inner conduit 18 into annulus 19 from which the fluid exits into lateral pipes 13 through respective ports 16 and into wellheads 11. The flowpath through header 10 forces the warm injection fluid to flow through the entire length of the inner conduit 18 and through at least a portion of annulus 19. This allows the warm fluid 23 to continuously transfer heat to the header and prevent freezing within the header so long as one or more wells are on line and the flow rate is sufficient to provide the necessary heat to prevent freezing.

FIG. 3 discloses a further embodiment of the present invention. Header 10a is comprised of an outer conduit 35 which is closed at its outer end by cap or closure plate 37 and which has a fluid opening 33 at its inner end. Outer conduit 35 has a plurality of ports 36 spaced along its length. An inner conduit 38, which is closed at its inner end 38a and open at its outer end 38b, is positioned within outer conduit 35 and has a plurality of openings 40 therein which are aligned with ports 36. Individual pipes 36a are secured in respective openings 40 in inner conduit 38 and extend through respective ports 36 in outer conduit 35 to provide fluid communication between the interior of inner conduit and respective lateral pipes 11 (FIG. 1).

In operations where header 10a is used as a collection or production header, production fluids flow from on-line wellheads 11 and through their respective lateral pipes 13 and through their respective pipes 36a into the inner conduit 35 of header 10a. The relative warm production fluids (black arrows 42 in FIG. 3) commingle in the inner conduit 38 and flow through open end 38b of conduit 38 into annulus 39 which is formed between the two conduits. The production fluids 42 then flow through the entire length of outer conduit 35, out fluid opening 33, and on to centralized location 14 (FIG. 1) for handling.

The flowpath through header 10a causes the warm, produced fluids to effectively flow along the entire length of the outer conduit 35 regardless of the number or location of the on-line, producing wells. This allows the warm production fluids to continuously transfer heat to the header 10a as they flow therethrough, thereby preventing freezing in any part of header 10a for so long as at least one well is on line and its flow rate is sufficient to provide the heat necessary.

In operations where header 10a is used as a distribution or injection header, the direction of flow is reversed but the results are again basically the same. That is, a relatively warm injection fluid (white arrows 43 in FIG. 3) is flowed from centralized location 14 into outer conduit 35 of header 10a through fluid opening 33. Fluid 43 flows through annulus 39 and into inner conduit 38 through open end 38b from which the fluid exits into lateral pipes 13 to wellheads 11 through respective pipes 36a. The flowpath through header 10 forces the warm injection fluid to flow through the entire length of the outer conduit 35 (i.e. through the length of annulus 39) thereby allowing the warm fluid 43 to continuously transfer heat to the header and prevent freezing within the header so long as one or more wells are on line and the flow rate is sufficient to provide the heat necessary to prevent freezing in the header.

What is claimed is:

1. A header for fluidly connecting a plurality of spaced terminals, said header comprising:

an outer conduit having an outer and an inner end, said outer conduit being closed at its outer end and adapted to extend from a centralized location to a point substantially adjacent or beyond the terminal furthest from said centralized location, said outer conduit having a plurality of ports spaced along its length, an inner conduit positioned within and extending substantially throughout the length of said outer conduit thereby forming an annulus between said inner conduit and said outer conduit, the outer end of said inner conduit being in fluid communication with said annulus to allow flow between said inner conduit and said annulus thereby defining a flowpath through said header whereby fluid flows through both said inner conduit and said annulus; and means adapted for fluidly connecting each of said plurality of terminals to said header through a respective said port in said outer conduit.

2. The header of claim 1 wherein said inner conduit extends from said centralized location; and wherein said outer end of said inner conduit is open and terminates short of said closed end of said outer conduit thereby allowing flow between said inner conduit and said annulus; and wherein said means adapted for fluidly connecting said header to each of terminals comprises:
   individual pipes, each of which is fluidly connected to a respective one of said plurality of ports in said outer conduit to thereby allow flow between said annulus and said respective terminals.

3. The header of claim 1 wherein said inner end of said outer conduit has a flow opening therethrough to allow flow between said centralized location and said annulus in said header; and wherein said inner conduit is completely contained within said outer conduit and is closed at its inner end and is in fluid communication with said annulus at its outer end, said inner conduit having a plurality of openings spaced along the length thereof, each of said openings being aligned with a respective port in said outer conduit;

and wherein said means adapted for fluidly connecting said header to each of terminals comprises:
   individual pipes, each of which is fluidly connected to a respective one of said plurality of openings in said inner conduit, each of said individual pipes passing through a respective port in said outer conduit to allow flow between said inner conduit and the respective terminals.

4. A header for fluidly connecting a plurality of spaced terminals, said header comprising:

an outer conduit having an outer and an inner end, said outer conduit being closed at its outer end and adapted to extend from a centralized location to a point substantially adjacent or beyond the terminal furthest from said centralized location, said outer conduit having a plurality of ports spaced along its length, an inner conduit passing through said inner end of said outer conduit and extending substantially throughout the length of said outer conduit thereby forming an annulus between said inner conduit and said outer conduit, the inner end of said inner conduit adapted to be fluidly connected to a facility at said centralized location with the outer end of said inner conduit being in fluid communication with said annulus to allow between said inner conduit and said annulus thereby defining a flowpath through said header whereby fluid flows through both said inner conduit and said annulus; and means adapted for fluidly connecting each of said plurality of said ports to a respective terminal to allow flow between said annulus and said wellheads.

5. The header of claim 4 wherein said outer end of said inner conduit is open and terminates short of said closed end of said outer conduit thereby allowing flow between said inner conduit and said annulus; and wherein said means adapted for fluidly connecting said header to each of terminals comprises:
   individual pipes, each of which is fluidly connected to a respective port in said outer conduit to thereby allow flow between said annulus and said respective terminals.

6. A header for fluidly connecting a plurality of spaced terminals, said header comprising:

an outer conduit having an outer and an inner end, said outer conduit adapted to extend from a centralized location to a point substantially adjacent or beyond the terminal furthest from said centralized location, said outer conduit being closed at its outer end and having a flow opening through its inner end adapted to be fluidly connected to a facility at said centralized location;

an inner conduit positioned within said outer conduit and extending substantially throughout the length of said outer conduit thereby forming an annulus between said inner conduit and said outer conduit, the inner end of said inner conduit being closed with the outer end of said inner conduit being in fluid communication with said annulus to allow flow between said inner conduit and said annulus thereby defining a flowpath through said header whereby fluid flows through both said inner conduit and said annulus;

said inner conduit having a plurality of openings spaced along the length thereof; and means adapted for fluidly connecting each of said openings in said inner conduit to a respective terminal to thereby allow flow between said inner conduit and said terminals.

7. The header of claim 6 wherein said means for connecting each of said openings to a respective terminal comprises:

a plurality of ports spaced along said outer conduit;

individual pipes, each of which is fluidly connected to a respective one of said plurality of openings in said inner conduit, said individual pipes passing through a respective port in said outer conduit.

8. The header of claim 6 wherein each of said plurality of terminals is comprised of a wellhead of a well.

9. The header of claim 8 wherein said header is a production header wherein produced fluids from said wellheads flows into said inner conduit through said pipes, into and through said annulus and through said flow opening in said header to said facility at said centralized location.

10. The header of claim 8 wherein said header is an injection header wherein an injection fluid is flowed from said facility at said centralized location, through said flow opening in said outer conduit and through said annulus and out through said pipes to said wellheads.

* * * * *